May 28, 1929.                E. SLADE                1,715,105
CLUTCH DISK AND METHOD OF MAKING THE SAME
Original Filed May 9, 1923    2 Sheets-Sheet 1
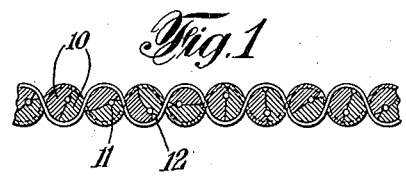
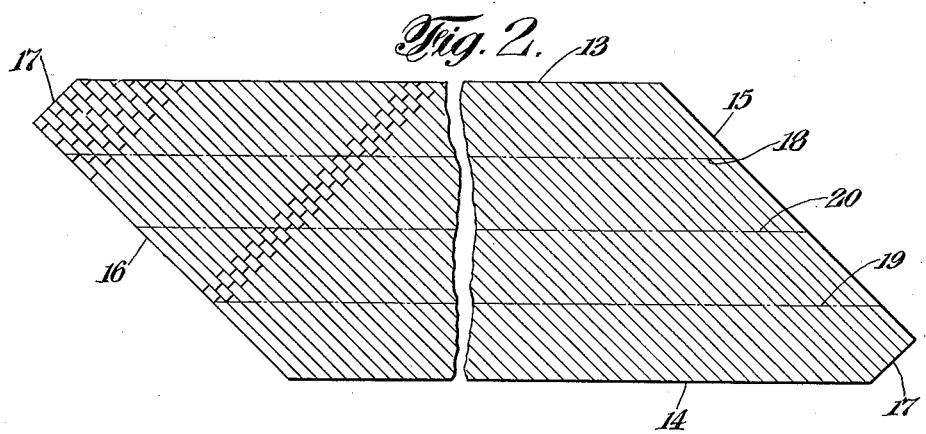
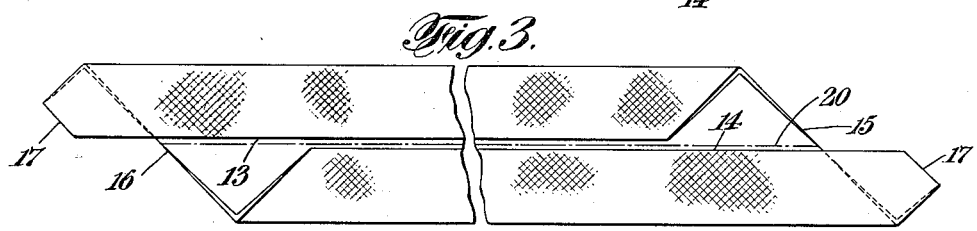
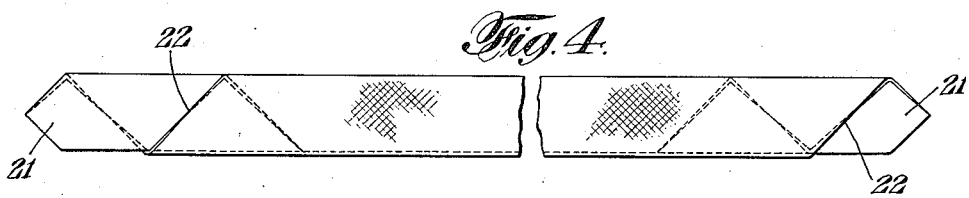
INVENTOR.
Edward Slade
BY Kenyon & Kenyon
ATTORNEYS.

May 28, 1929.  E. SLADE  1,715,105
CLUTCH DISK AND METHOD OF MAKING THE SAME
Original Filed May 9, 1923  2 Sheets-Sheet 2

INVENTOR.
Edward Slade
BY
Kenyon & Kenyon
ATTORNEYS.

Patented May 28, 1929.

1,715,105

UNITED STATES PATENT OFFICE.

EDWARD SLADE, OF NEW YORK, N. Y.

CLUTCH DISK AND METHOD OF MAKING THE SAME.

Original application filed May 9, 1923, Serial No. 637,622, Patent No. 1,681,371, and in Great Britain December 3, 1923. Divided and this application filed January 11, 1928. Serial No. 245,968.

This invention relates to a friction element suitable for use in friction clutches and generally referred to as clutch disks, clutch facings, etc., and the method of making same.

The invention aims to provide a clutch disk which will retain its size during use and which comprises a compact homogeneous mass of substantially uniform density throughout its thickness so that such a coefficient of friction that the clutch will not grip or slip excessively while it is being engaged or slip at all after engagement will exist during the entire life of the disk, and one which will not be affected by moisture, grease or temperature variations and consequently will not adhere to the clutch plates.

In the drawing which illustrates the preferred method of making the clutch disk and also the clutch disk itself, Figure 1 is an enlarged sectional view showing the character of the fabric used, Fig. 2 is a plan view of the fabric showing the same cut into the desired configuration for folding into the clutch disk;

Fig. 3 is a plan view showing the fabric after the first folding operation;

Fig. 4 is a similar view showing the fabric after the second folding operation;

Fig. 5 is an end elevation looking at the end of Fig. 4;

Figure 6:
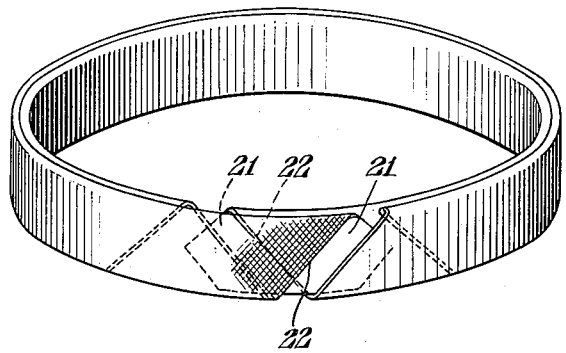
Fig. 6 is a perspective view showing the folded fabric bent into the circular form which it assumes before receiving its compression and with the ends slightly separated to show their relative positions.

While many of the so-called wire inserted asbestos fabrics may be used in the making of the clutch disk of this invention subjected to certain of the steps of this improved method, I contemplate the use of a fabric composed of an asbestos yarn which is twisted to form as hard and compact a mass as possible, as little cotton as is practicable, and metal.

To form the weft strands of the cloth two or more strands of the yarn are twisted or wound together and with these strands a wire, preferably of bronze, is incorporated so that it extends longitudinally with the strands and in a more or less haphazard arrangement.

The warp strands of the cloth are of wire, preferably bronze, and are so woven with the weft strands that they are bent about the latter, passing beneath one strand and over the next (see Figure 1) and so on. This brings the weft strands very closely together and at the same time the arrangement of the warp strands results in a clamping action on the fibres of the weft without substantially penetrating the latter.

Referring particularly to the embodiment of the invention illustrated in the drawing, the arrangement of the weft and warp strands of the cloth is shown in Figure 1. The weft strand includes the two hard twisted asbestos strands 10 which are wound together and with which is incorporated the wire 11. These weft strands are arranged side by side, as illustrated, and are bound together by the undulated wire warp strands 12 which, as hereinbefore stated, firmly clamp and bind the weft strands together in close proximity to each other without substantially penetrating the fibres of said strands.

The thus formed fabric is thoroughly impregnated, under pressure, with a highly heat resistant, water and grease proof compound, such as graphite, which possesses the necessary lubricating but non-adhesive characteristics to insure a smooth starting control and a positive grip by the ultimate clutch disk.

The thus formed and treated fabric is cut into suitable form for the subsequent folding and compression into a clutch disk so that the warp and weft strands run on a bias to both dimensions of the blank. The blank into which this fabric is cut is shown in Figure 2 of the drawing, and from this it will be noted that the sides of the blank 13 and 14 are cut parallel with each other, and the ends 15 and 16 parallel with each other but on a bias with relation to the sides. The diagonally opposite extremities of the blank are cut off as at 17 for a purpose which will later appear.

It is to be noted that the weft strands extend transversely of the longitudinal direction of the blank in a diagonal direction, and that the warp strands, likewise, extend transversely but in the opposite diagonal direction.

It is to be further noted that the ends 15 and 16 are cut parallel with the weft strands so that the formation of the blank by the cutting of these ends results in the cutting of the warp strands alone.

The blank thus formed is twice folded along lines 18 and 19 parallel with the sides 13 and 14 into the form illustrated in Figure 4, so that the blank then consists of a series of laminations such as illustrated in Figure 5. It is to be understood that the disk may be formed of as many thicknesses of fabric as the conditions of use require. It is to be noted that, by this folding, the warp and weft strands of the cloth are kept on a bias with relation to both dimensions of the folded blank, and that the cut ends of the weft strands, or, in other words, the sides 13 and 14 of the blank, are folded inwardly so that the blank as finally produced contains no exposed, rough or broken ends of the fibre.

During the folding of the blank into the forms illustrated in Figures 3, 4 and 5, pressure is applied, preferably, after each folding operation so as to substantially shape and compress the blank before the ends are interlaced as in Figure 6.

It will be noted that in the folding a tongue 21 is produced at each end of the blank, as is also a pocket 22.

The thus folded blank is bent into continuous form and the tongue on each end inserted into the pocket in the opposing end, the method of insertion being illustrated in Figure 6 of the drawing.

Figure 7:
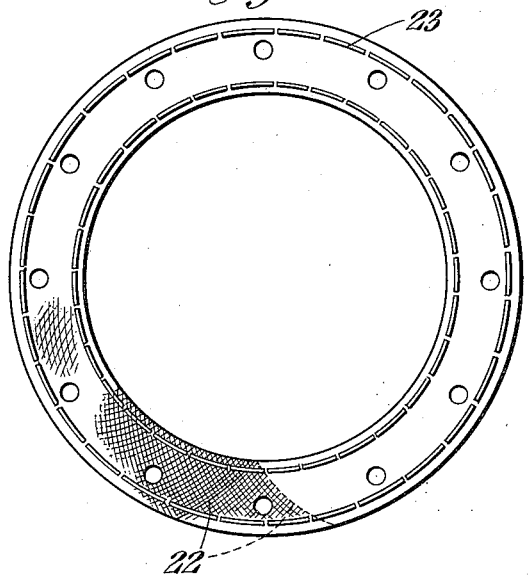
Fig. 7 is a plan view of the complete disk.

Following the formation of the blank into its circular form, as illustrated in Figure 6, pressure is applied to cause it to assume an annular form, roughly of the size of the ultimate disk. The clutch disk may be formed from the blank as shown in Fig. 6 by any of several methods. For instance, it may be compressed into the form shown in Fig. 7 by suitable co-operating dies and plungers, the disks being such as to cause the expansion of the lower edge of the blank in the form shown in Fig. 6 to the diameter shown in Fig. 7. The arrangement and configuration of these dies is, of course, within the ordinary mechanical skill. For instance, they may be similar to the die and plunger shown in my Patent 1,610,173. The thus formed annulus is stitched, preferably, with concentric rows of clinched brass rivets 23 which act to bind the laminations or plies together.

The product so formed is then moulded into more nearly its final form and again compressed and under very great pressure. Following this, the compressed, impregnated disk is heat-treated to drive off the volatiles of the impregnating compound and to bring them to such consistency that they will be available during the entire life of the disk to cause its even wearing and uniform gripping action.

This product, thus formed, is again subjected to pressure in a mould which brings it to the exact size desired, and if it is desirable to produce countersunk rivet holes in the disk, this may be done at the same time or by subsequent operation.

Figure 8:
Fig. 8 is a sectional view through the complete disk, the section being taken on line 8—8, Fig. 7.

It will be seen that this method of formation of the disk results in the disposition of the strands of the fabric on a bias, not only in the blank, but also in the finished product. As will be clear from Fig. 7, it will be seen that the strands of the fabric are diagonally disposed with respect to the radii of the disk. Referring to Fig. 8, it will be seen that the disk has two flat and substantially parallel faces, which are perpendicular to the axis of the disk.

The disposition of the strands of the fabric on a bias in the blank makes it possible to mould the blank into an annular form without putting undue strain upon the fabric and the folding of the fabric in the manner described to form the laminations with the raw edges turned in insures the maximum efficiency since during use the clutch disk will retain its density and size.

Furthermore, the formation of the extended tongues 21 and the receiving pockets 22 by the folding of the fabric makes it possible to form an overlapping interwoven permanent joint between the ends in the final clutch disk. Moreover, the interlacing of the tongues in the pockets at the opposite ends of the blank insures not only the overlapping interlaced joint, but also results in a disk of uniform thickness and density substantially throughout its extent which will give the maximum efficiency obtainable.

This application is a division of applicant's co-pending application Serial Number 637,622, filed May 9, 1923.

I claim:

1. The method of making a clutch disk or lining which comprises impregnating a wire inserted fabric with a lubricant bearing compound, cutting a blank therefrom, folding the blank into tubular form, interlacing the ends of the folded blank, moulding the thus formed blank into annular form, subjecting the same to a heat treatment to set the lubricant in the fabric and compressing the thus treated article.

2. The method of making a clutch disk or lining which comprises forming a fabric having weft strands consisting of twisted asbestos fibre and inserted wire and wire warp strands, impregnating the fabric with a lubricant bearing compound, cutting the thus formed and impregnated fabric into a blank so that the weft and warp strands are arranged on a bias with its longitudinal dimension, folding the blank longitudinally into laminations with the edges thereof turned inwardly, joining the ends of the folded blank, moulding and compressing the same into annular form, stitching the laminations together, again moulding and compressing the same, subjecting the same to a heat treatment, and finally compressing and moulding the same to exact size.

3. The method of making a clutch disk or lining which comprises forming a fabric having weft strands consisting of twisted asbestos fibre and inserted wire and wire warp strands, impregnating the fabric with a lubricant bearing compound, cutting the thus formed and impregnated fabric into a blank so that the weft and warp strands are arranged on a bias with its longitudinal dimension, folding the blank longitudinally into laminations, joining the same into annular form, again moulding and compressing the same, subjecting the same to a heat treatment, and finally compressing and moulding the same to exact size.

4. The method of making a clutch disk or lining which comprises forming a fabric having weft strands consisting of twisted asbestos fibre and inserted wire and wire warp strands, impregnating the fabric with a lubricant bearing compound, cutting the thus formed and impregnated fabric into a blank so that the weft and warp strands are arranged on a bias with its longitudinal dimension, folding the blank into circular laminated form, pressing the blank into annular form, and subjecting the same to a heat treatment.

5. The method of making a clutch disk or lining which consists in forming an asbestos lubricant impregnated fabric into circular form with the warp and weft strands arranged on a bias to the edge thereof, compressing the same into annular form, subjecting the same to heat treatment, and subsequently compressing the same into final size.

6. The method of making a clutch disk or lining which comprises forming a fabric having weft strands consisting of twisted asbestos fibre and inserted wire and wire warp strands, impregnating the fabric with a lubricant bearing compound, cutting the thus formed and impregnated fabric into a blank so that the weft and warp strands are arranged on a bias with its longitudinal dimension, folding the blank into circular laminated form, pressing the blank into annular form, and simultaneously pressing rivet holes in the same.

7. The method of making a clutch disk or lining which comprises forming a fabric having weft strands consisting of twisted asbestos fibre and inserted wire and wire warp strands, impregnating the fabric with a lubricant bearing compound, cutting the thus formed and impregnated fabric into a blank so that the weft and warp strands are arranged on a bias with its longitudinal dimension, folding the blank into circular laminated form, pressing the blank into annular form, and simultaneously pressing countersunk rivet holes in the same.

8. The method of making a clutch disk or lining which comprises forming a fabric having weft strands consisting of twisted asbestos fibre and inserted wire and wire warp strands, impregnating the fabric with a lubricant bearing compound, cutting the thus formed and impregnated fabric into a blank so that the weft and warp strands are arranged on a bias with its longitudinal dimension, folding the blank into circular laminated form, pressing the blank into annular form, binding the laminations together with metal rivets.

9. The method of making a clutch disk or lining which comprises forming a fabric having weft strands consisting of twisted asbestos fibre and inserted wire and wire warp strands, impregnating the fabric with a lubricant bearing compound, cutting the thus formed and impregnated fabric into a blank so that the weft and warp strands are arranged on a bias with its longitudinal dimension, folding the blank into circular laminated form, pressing the blank into annular form, binding the laminations together with metal rivets, each having two points of insertion.

In testimony whereof, I have signed my name to this specification.

EDWARD SLADE.